United States Patent
Xu

(10) Patent No.: US 12,545,341 B2
(45) Date of Patent: Feb. 10, 2026

(54) MOTION CONTROL METHOD AND APPARATUS, ROBOT, AND READABLE STORAGE MEDIUM

(71) Applicant: BEIJING XIAOMI ROBOT TECHNOLOGY CO., LTD., Beijing (CN)

(72) Inventor: Zhe Xu, Beijing (CN)

(73) Assignee: BEIJING XIAOMI ROBOT TECHNOLOGY CO., LTD., Beijing (CN)

( * ) Notice: Subject to any disclaimer, the term of this patent is extended or adjusted under 35 U.S.C. 154(b) by 89 days.

(21) Appl. No.: 18/381,626

(22) Filed: Oct. 18, 2023

(65) Prior Publication Data

US 2024/0182125 A1  Jun. 6, 2024

(30) Foreign Application Priority Data

Dec. 1, 2022 (CN) .......................... 202211538099.1

(51) Int. Cl.
*B25J 9/16* (2006.01)
*B62D 57/032* (2006.01)

(52) U.S. Cl.
CPC ............ *B62D 57/032* (2013.01); *B25J 9/163* (2013.01); *B25J 9/1664* (2013.01)

(58) Field of Classification Search
CPC ....... B62D 57/032; B25J 9/163; B25J 9/1664; B25J 9/161; B25J 13/00; B25J 9/1666; B25J 9/1676; G05B 2219/40395; G05B 2219/40512; G05B 2219/40519; G05D 1/0212
See application file for complete search history.

(56) References Cited

U.S. PATENT DOCUMENTS

| 2018/0056512 | A1* | 3/2018 | Watts | B25J 9/1664 |
| 2023/0087057 | A1* | 3/2023 | Wang | B25J 9/1648 |
| | | | | 700/245 |

FOREIGN PATENT DOCUMENTS

| CN | 105599816 A | 5/2016 |
| CN | 108860360 A | 11/2018 |

(Continued)

OTHER PUBLICATIONS

An_Optimal_Motion_Planning_Framework_for_Quadruped_Jumping.pdf (Zhitao Song, Linzhu Yue, Guangli Sun, Yihu Ling, Hongshuo Wei, Linhai Gui and Yun-Hui Liu, An Optimal Motion Planning Framework for Quadruped Jumping, Oct. 23-27, 2022, IEEE, pp. 11366-11373) (Year: 2022).*

(Continued)

*Primary Examiner* — Bao Long T Nguyen
(74) *Attorney, Agent, or Firm* — Arch & Lake LLP; Hao Tan; Shen Wang

(57) ABSTRACT

The present disclosure provides a motion control method and apparatus, a robot and a non-transitory storage medium. The method includes: obtaining a jump parameter of the robot, the jump parameter including an expected velocity and an expected jump height before take-off of the robot; obtaining a jump trajectory corresponding to the jump parameter in a preset action library, the action library including a jump trajectory that is marked with a corresponding jump parameter; and controlling the robot to reach the expected velocity, and controlling the robot to jump according to the jump trajectory.

18 Claims, 4 Drawing Sheets

(56) References Cited

FOREIGN PATENT DOCUMENTS

| CN | 111367327 A | 7/2020 |
|---|---|---|
| CN | 111857173 A | 10/2020 |
| CN | 112859875 A | 5/2021 |

OTHER PUBLICATIONS

Zhitao Song et al., "An Optimal Motion Planning Framework for Quadruped Jumping," 2022 IEEE/RSJ International Conference on Intelligent Robots and Systems (IROS), XP034257602, Kyoto, Japan, Oct. 23-27, 2022, (8p).
Yunsong Hao et al., "Run-and-jump Planning and Control of a Compact Two-wheeled Legged Robot," 2022 IEEE, 7th Asia-Pacific Conference on Intelligent Robot Systems (ACIRS 2022), XP034169910, Jul. 1, 2022, (6p).
Hae-Won Park et al., "Jumping over obstacles with MiT Cheetah 2," Robotics and Autonomous Systems, vol. 136, Elsevier BV, Amsterdam NL, XP086444100, Nov. 28, 2020, (12p).
Yulun Zhuang et al., "Height Control and Optimal Torque Planning for Jumping WithWheeled-Bipedal Robots," 2021 6th IEEE International Conference on Advanced Robotics and Mechatronics, XP033973208, Chongqing, China, Jul. 3-5, 2021, (6p).
He Li et al., "Versatile Real-Time Motion Synthesis via Kino-Dynamic MPC with Hybrid-Systems DDP," Arxiv.Org, Cornell University Library, XP091329590, Sep. 28, 2022, (7p).
Chuong Nguyen et al., "Continuous Jumping for Legged Robots on Stepping Stones via Trajectory Optimization and Model Predictive Control," Arxiv.Org, Cornell University Library, XP091211508, Apr. 3, 2022, (7p).
Extended European Search Report issued in EP Application No. 23207338.7 dated May 7, 2024, (10p).
MIT Biomimetic Robotics Lab, "Reflexive Control for Manipulation", (3p).
Robotic Systems Lab _ ETH Zurich, (4p).
GitHub—mit-biomimetics_Cheetah-Software, (3p).
"Highly Dynamic Quadruped Locomotion via Whole-Body Impulse Control and Model Predictive Control", Computer Science, Robotics, arXiv:1909.06586. (3p).
"Introduction and code implementation of ZMP preview control algorithm for biped robots", Hourglass, (17p).
Christian Gehrin, et al., "Controlling Dynamic Gaits for Quadrupedal Robots", (2p).
LegLab_YouTube, Boston Dynamics, (11p).
Xiaomi Technology, "The development direction of motion control of legged robots—trajectory optimization", (19p).

\* cited by examiner

MOTION CONTROL METHOD AND APPARATUS, ROBOT, AND READABLE STORAGE MEDIUM

CROSS REFERENCE TO RELATED DOCUMENT(S)

The present application claims the benefit of priority to Chinese patent application No. 202211538099.1, filed on Dec. 1, 2022, the disclosure of which is incorporated herein by reference in its entirety for all purposes.

TECHNICAL FIELD

The present disclosure relates to the robot technical field, and more specifically, to a motion control method and apparatus, a robot and a non-transitory readable storage medium.

BACKGROUND

With the advancement of robot technologies, legged robots that can jump, such as quadruped robots, have gradually attracted attentions in the industry.

SUMMARY

Embodiments of the present disclosure provide a motion control method and apparatus, a robot and a non-transitory storage medium.

According to a first aspect of embodiments of the present disclosure, there is provided a motion control method. The method is applied to a legged robot, and the method includes:
  obtaining a jump parameter of the robot, where the jump parameter includes an expected velocity and an expected jump height before take-off of the robot;
  obtaining a jump trajectory corresponding to the jump parameter in a preset action library, where the action library includes a jump trajectory that is marked with a corresponding jump parameter; and
  controlling the robot to reach the expected velocity, and controlling the robot to jump according to the jump trajectory.

According to a second aspect of embodiments of the present disclosure, there is provided a motion control apparatus. The apparatus is applied to a legged robot, and the apparatus includes:
  a parameter obtaining module configured to obtain a jump parameter of the robot, where the jump parameter includes an expected velocity and an expected jump height before take-off of the robot;
  a trajectory obtaining module configured to obtain a jump trajectory corresponding to the jump parameter in a preset action library, where the action library includes a jump trajectory that is marked with a corresponding jump parameter; and
  a jump control module configured to control the robot to reach the expected velocity, and controlling the robot to jump according to the jump trajectory.

In connection with any implementation of the present disclosure, the apparatus further includes:
  an action library obtaining module configured to input multiple sets of preset jump parameters into a preset cost function model as reference values to obtain corresponding multiple jump trajectories, where the jump trajectory includes a control parameter of the robot at a corresponding sampling point in a jump procedure.

According to a third aspect of embodiments of the present disclosure, there is provided a robot, including:
  a memory for storing processor-executable instructions; and
  a processor configured to execute the executable instructions in the memory to implement steps of the method according to any implementation of the first aspect.

According to a fourth aspect of embodiments of the present disclosure, there is provided a non-transitory computer-readable storage medium having a computer program stored thereon. When the program is executed by a processor, steps of the method according to any implementation of the first aspect are implemented.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of the specification, illustrate embodiments consistent with the present disclosure and together with the description serve to explain the principles of the present disclosure.

DETAILED DESCRIPTION

Reference will now be made in detail to the example embodiments, examples of which are illustrated in the accompanying drawings. When the following description refers to the accompanying drawings, the same numerals in different drawings refer to the same or similar elements unless otherwise indicated. The implementations described in the following example embodiments do not represent all implementations consistent with the present disclosure. Rather, they are merely examples of apparatuses and methods consistent with aspects of the present disclosure as recited in the appended claims.

The terminologies used in the present disclosure is for the purpose of describing particular embodiments only, and are not intended to limit the present disclosure. As used in the disclosure and the appended claims, the singular forms "a/an", "the", and "said" are intended to include a plural form as well unless otherwise indicated. It should also be understood that the term "and/or" as used herein refers to and includes any or all possible combinations of one or more of associated listed items.

It should be understood that although the terms "first", "second", "third", etc. may be used in the present disclosure to describe various information, the information should not be limited to these terms. These terms are only used to distinguish information of the same type from one another. For example, without departing from the scope of the present disclosure, first information may also be called second information, and similarly second information may also be called first information. Depending on the context, the word "if" as used herein may be interpreted as "in a case where" or "when" or "in response to determining that . . . ".

At present, legged robots capable of jumping are gradually attracting attention from the industry. However, most of the current methods for controlling jump of legged robots control the robots to take off based on a stationary state. The jump height is limited by the rotation speed of robot joints and force torque, the jump effect is not ideal, and it is hard to realize further improvements. In addition, some technologies have proposed jump control methods for wheel-footed or underactuated robots. However, in related methods, a model simplification method for robots cannot be applied to legged robots.

In view of the above, the present disclosure provides a motion control method applied to a legged robot to at least solve the problem existing in related art.

Figure 1:
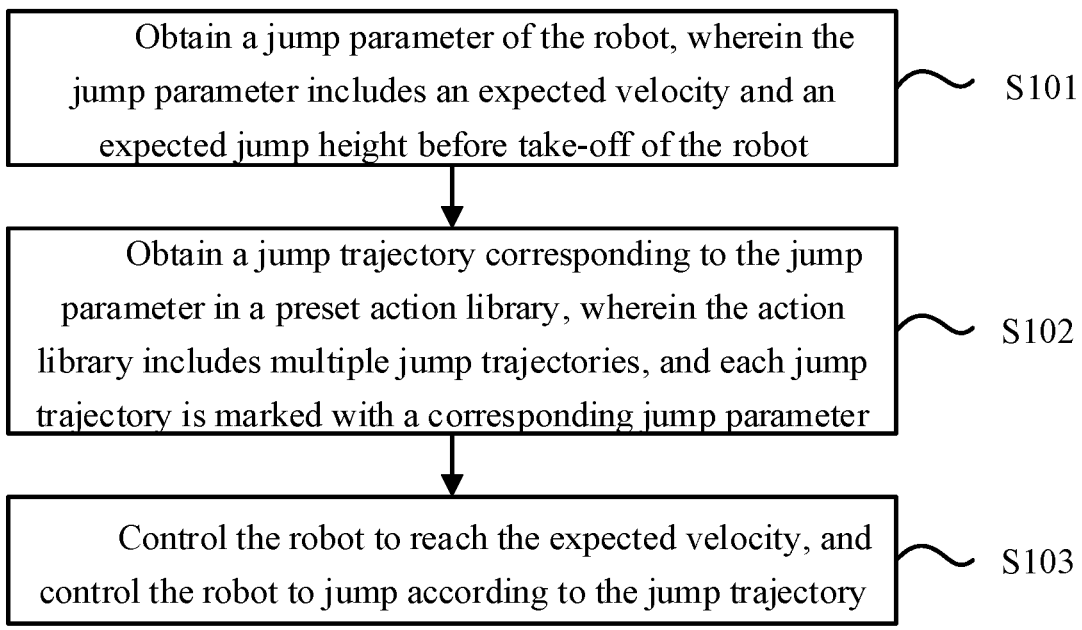
FIG. 1 is a flowchart of a motion control method according to an example embodiment of the present disclosure.

FIG. 1 shows a flowchart of a motion control method according to an example embodiment of the present disclosure.

In step S101, a jump parameter of the robot is obtained. The jump parameter includes an expected velocity and an expected jump height before take-off of the robot.

Figure 2:
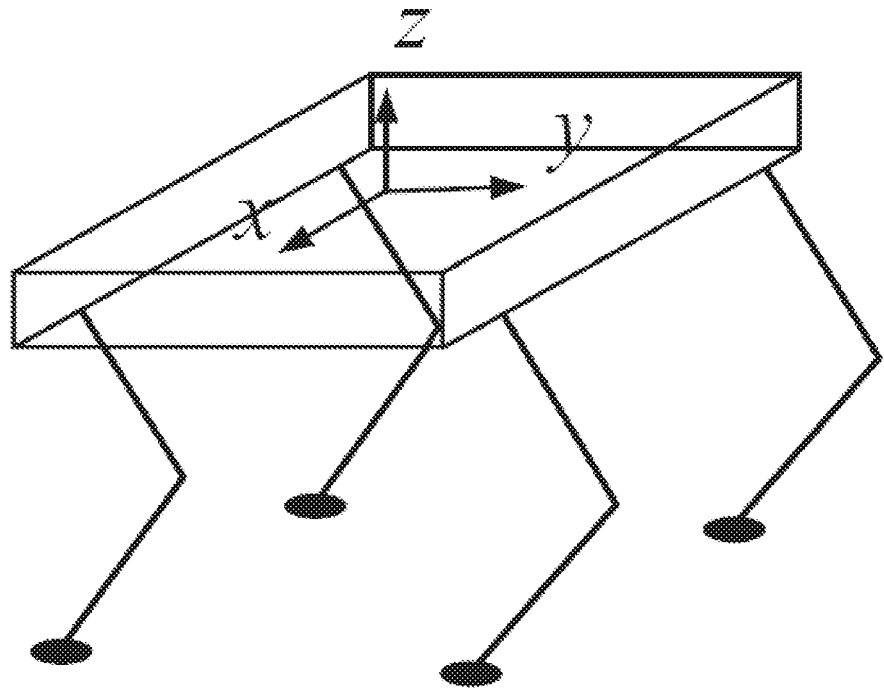
FIG. 2 is a schematic coordinate diagram of a quadruped robot according to an example embodiment of the present disclosure.

In the solutions described in embodiments of the present disclosure, the robot determines a specific jump action based on a jump parameter, and the jump parameter includes an expected velocity and an expected jump height of the robot before take-off. The expected velocity before take-off represents a final horizontal velocity of the robot before jumping. Taking a coordinate diagram of a quadruped robot shown in FIG. 2 as an example, if a forward direction and a jump direction of the robot are along the positive direction of the x-axis, the above-mentioned expected velocity is a velocity of the robot along the x-axis before take-off. The expected jump height represents the maximum height from the ground that the robot foot end can reach after the robot jumps.

The robot may obtain the jump parameter in various ways, and specific examples are described later.

It can be understood that, in addition to the above examples, the jump parameter may also include other parameters related to robot jump control, such as a jump distance, a pitch angle when taking off, etc., which is not limited in embodiments of the present disclosure.

In step S102, a jump trajectory corresponding to the jump parameter is obtained in a preset action library. The action library includes a jump trajectory that is marked with a corresponding jump parameter.

The action library is composed of a jump trajectory that is marked with a corresponding jump parameter. Because the jump procedure of the robot is different from a horizontal walking procedure, the torso is not in a horizontal state and the velocity direction changes all the time, the existing walking control algorithm cannot be used to control the robot's jump. In order to solve this problem, the present disclosure uses a trajectory optimization algorithm to accurately optimize the jump action of the robot. However, due to the large amount of calculations involved in the trajectory optimization algorithm, it is not beneficial to complete real-time solution in an onboard computer of the robot. It is possible to calculate and store multiple jump trajectories according to preset jump parameters in an offline state, and accordingly establish the action library, so that the robot can directly obtain the corresponding jump trajectory from the action library according to the received jump parameter during the jump procedure, thereby reducing calculation time and calculation pressure. Each jump trajectory includes a control parameter of the robot at each sampling point in a jump procedure.

Table 1 is a schematic diagram of an action library according to an example embodiment of the present disclosure:

TABLE 1

| Expected velocity/ Expected jump eight | Expected jump eight | | | | |
| --- | --- | --- | --- | --- | --- |
| | 5 cm | 10 cm | 15 cm | 20 cm | 25 cm |
| 0.5 m/s | 1-1 | | | | |
| 1.0 m/s | 2-1 | 2-2 | | | |
| 1.5 m/s | 3-1 | 3-2 | 3-3 | | |
| 2.0 m/s | 4-1 | 4-2 | 4-3 | 4-4 | |
| 2.5 m/s | 5-1 | 5-2 | 5-3 | 5-4 | 5-5 |

As shown in Table 1, a jump parameter includes an expected velocity and an expected jump height, and the action library is composed of multiple jump trajectories generated based on jump parameters. The blank cell in Table 1 indicates that a corresponding jump trajectory cannot be generated under the current corresponding expected velocity and expected jump height. The non-blank cell in Table 1 represents a jump trajectory that has been generated. For example, "1-1" represents a jump trajectory when the expected velocity is. 0.5 m/s and the expected height is 5 cm. Each jump trajectory can be marked with a corresponding jump parameter, so as to facilitate timely search.

In the solutions described in the present disclosure, after the jump parameter of the robot is obtained, the jump trajectory corresponding to the corresponding jump parameter can be obtained in the preset action library. For example, if the expected velocity is 2.0 m/s and the expected jump height is 20 cm in the obtained jump parameter, then the trajectory "4-4" is determined as the current jump trajectory.

Preferably, if a corresponding jump trajectory cannot be searched based on the jump parameter, when a difference between the obtained jump parameter and a preset jump parameter in the action library is within a preset range, a jump trajectory corresponding to a jump parameter close to the obtained jump parameter can be selected, so as to ensure that the actual expected velocity and expected jump height of the robot are greater than or equal to the expected velocity and expected jump height corresponding to the jump parameter. For example, if the obtained expected velocity is 0.8 m/s and the expected jump height is 9 cm, in order to make the actual expected velocity and expected jump height of the robot greater than or equal to the expected velocity and expected jump height corresponding to the jump parameter, the trajectory "2-2" can be determined as the current jump trajectory.

However, if the difference between the obtained jump parameter and a preset jump parameter in the action library is too large, that is, based on the preset action library, a jump trajectory corresponding to the jump parameter cannot be obtained. For example, the expected velocity is 1.0 m/s and the expected jump height is 25 cm, prompt information may be sent to a terminal device to prompt a user that there is currently no applicable jump trajectory. For example, the terminal device includes a mobile phone or a remote controller which is provided with a robot APP and establishes a connection with the robot in advance.

In step S103, the robot is controlled to reach the expected velocity, and the robot is controlled to jump according to the jump trajectory.

After obtaining the jump trajectory, firstly, the robot needs to be controlled to reach the expected velocity, that is, to complete the "run-up" before jump, so as to increase the kinetic energy of the robot before jump, and thus the robot can obtain a better jump effect.

In one example, the robot may use a Model Predictive Control (MPC) module to calculate a reaction force required by the robot in the "run-up" stage, and input the reaction force to a Whole Body Control (WBC) module to a robot control parameter in this stage, to make the robot reach the expected velocity. It is understandable that the horizontal movement control method of the multi-legged robot is relatively mature, and the present disclosure does not limit the specific control method in the "run-up" procedure.

In addition, any periodic gait may be used to achieve accelerated movement during the process of the robot reaching the expected velocity from the current state, such as Trot (diagonal legs form a group), Bound (front or rear legs form a group), Pace (legs on the same side form a group) or other periodic gaits, and the present disclosure does not limit this.

After the robot reaches the expected velocity, the robot may be controlled to jump according to the jump trajectory. Specifically, specific robot control parameters in the jump trajectory may be input to motion controllers of the robot, so that the robot can complete the corresponding jump action. The motion controllers may include WBC, a joint position controller, a joint velocity controller, a force torque controller, etc.

Technical solutions provided by the embodiments of the present disclosure may include the following beneficial effects:

The solutions described in the present disclosure obtain the jump trajectory corresponding to the jump parameter in the preset action library, and control the robot to jump according to the jump trajectory after reaching the expected velocity, so that the robot accumulates kinetic energy by accelerating the run-up before jumping, thereby achieving a more ideal jump effect during jump. And, by establishing an action library, the calculation time is saved during the jump procedure, and the jump trajectory corresponding to the jump parameter is obtained in time, thus reducing calculation pressure.

In an alternative embodiment, the establishment of the action library includes:

inputting multiple sets of preset jump parameters into a preset cost function model as reference values to obtain corresponding multiple jump trajectories, where a jump trajectory includes a control parameter of the robot at a corresponding sampling point during the jump procedure.

Specifically, the present disclosure uses a trajectory optimization algorithm to accurately optimize the jump action of the robot in advance to obtain multiple jump trajectories. For example, the cost function in the trajectory optimization algorithm is shown in formula (1):

$$y = \min_{u} \int_{t=0}^{T} J(x, u)dt + h(x, u) \quad (1)$$

In formula (1), x, u respectively represent a state variable and a control variable of the robot system. Taking a single rigid body model as an example, its coordinate system is established at the geometric center of the robot, and its state variable X includes a three-dimensional position p, a three-dimensional pose θ, a three-dimensional linear velocity v and a three-dimensional angular velocity ω of the rigid body, and the control variable u includes a plantar force of all foot ends, where each foot can be applied with a three-dimensional force. For example, a quadruped robot has a total of 12-dimensional force, which may be expressed by the following formula:

$$x = \begin{bmatrix} p \\ \theta \\ v \\ \omega \end{bmatrix},$$

$$u = \begin{bmatrix} f_1 \\ f_2 \\ f_3 \\ f_4 \end{bmatrix}$$

where J(x, u) represents the cost function of the robot during the jump procedure, and h(x, u) represents the cost function of the robot at the end time moment (that is, the time moment when each foot end is in contact with the ground) of the jump.

The cost function during the jump procedure may preliminarily obtain a reference a jump trajectory by setting a preset jump parameter for each sampling point in the jump stage and writing it in J(x, u) in the form of a quadratic form. It is also possible to write the preset jump parameter in J(x, u) in the quadratic form at a critical moment (such as the last moment before the robot takes off or the moment when the robot reaches the expected jump height), to ensure that the robot reaches the expected velocity before leaving the ground to ensure that the robot has sufficient kinetic energy and that the robot during the jump procedure can reach the expected jump height.

Similarly, the cost function at the end time moment of the jump may control the position of the robot relative to a world coordinate system and a joint pose of the robot at the moment of landing by writing the jump parameter at this moment in h(x, u) in a quadratic form.

Formula (1) is a continuous system expression. In order to facilitate the computer solution, the above cost function needs to be converted into a discrete form. The conversion result may be shown in formula (2):

$$y = \min \sum_{n=0}^{N} (x(n) - x_{ref}(n))^T Q(x(n) - x_{ref}(n)) + \quad (2)$$

$$(u(n) - u_{ref}(n))^T R(u(n) - u_{ref}(n))$$

In formula (2), x(n) and u(n) respectively represent a state variable and a control variable for each sampling point after discretization, $x_{ref}(n)$ and $u_{ref}(n)$ represent reference values of the discretized state variable and control variable at each sampling point generated based on the preset jump parameter, that is, the optimization direction of the jump trajectory. The Q and R respectively represent weights for evaluating the state variable and the control variable, both of which are positive semi-definite matrices. The corresponding weights may be increased or decreased according to actual needs to adjust the weight requirements for the jump parameter. For example, if the need for prioritizing satisfying the height of the robot during the jump procedure is greater than that of the jump distance, the weight value corresponding to the expected jump height may be increased so that the optimization result prioritizes satisfying the jump height.

Specifically, the cost function may be specifically expressed as:

$$y = \min \sum_{n=0}^{N} Q(p(n_{T_h}) - p_d(n_{T_h}))^T Q_p (p(n_{T_h}) - p_d(n_{T_h})) \quad (3)$$

where $$p(n_{T_h})$$

represents a three-dimensional position at a time moment when the robot reaches the highest point, $$p_d(n_{T_h})$$

represents an expected three-dimensional position at a time moment when the robot reaches the expected height, $Q_p$ is a semi-positive definite 3*3 matrix. If it is set that the highest point $T_h$ being satisfied needs to be prioritized, $Q_p$ may be set as all elements to be zero except for the elements in the third row and third column in the matrix (coefficient corresponding to the highest point $T_h$ in the jump procedure). The $$p_{z_d}(n_{T_h})$$

may be set as a relatively large value, and the optimization result based on this can give priority to satisfying the jump height.

By inputting multiple sets of different preset jump parameters as reference values into the preset cost function model, multiple corresponding jump trajectories can be obtained to construct the action library.

For the above cost function, its constraint may be determined according to at least one of the following models:

1. A Kinetic Model of the Robot:

In the trajectory optimization procedure, the kinetic model of the robot may be optimized to control the jump pose and joint state of the robot.

For example, the kinetic model of the robot may be expressed by formula (4):

$$\dot{x} = f(x, u) \quad (4)$$

Specifically, the kinetic model of the robot may adopt a full kinetic model that takes all connecting rods into consideration, a single rigid body model that only considers the pose of the robot torso, etc. The kinetic models are all nonlinear models. Taking the single rigid body model as an example, it may be expressed by formula (5):

$$\dot{x} = \begin{bmatrix} \dot{p} \\ \dot{\theta} \\ \dot{v} \\ \dot{\omega} \end{bmatrix} = \begin{bmatrix} v \\ B(\theta)\omega \\ \sum_{i=1}^{4} \frac{f_i}{m} - g \\ BI^{-1}\left(\sum_{i=1}^{4} r_i \times f_i - \omega \times (BI\omega)\right) \end{bmatrix} \quad (5)$$

In the formula (5), $B(\theta)$ represents mapping from the pose differential of the robot torso to the angular velocity, m represents the mass of the single rigid body, g represents the vector of gravity angular velocity, BI represents the inertia matrix of the single rigid body, and $r_i$ represents the vector from the coordinate system of the single rigid body to the foot end. Since the single rigid body may ignore the influence of the legs on the rigid body, the positions of the foot ends in the world coordinate system may be preset based on empirical values.

Similarly, in order to facilitate the computer solution, the above formula needs to be converted into a discrete form, and the conversion result may be shown as formula (6):

$$x(n+1) = x(n) + f(x(n), u(n))T \quad (6)$$

In formula (6), T represents a discretization step length. A state variable of next sampling may be determined according to the state variable and the control variable of the robot at the current sampling point, so as to realize the dynamic constraint on the robot.

2. A Velocity Model of a Foot End of the Robot Relative to the Ground:

The velocity model of the robot relative to the ground may be processed through equality constraint, and the schematic continuous system formula and discrete formula are shown in formula (7) and formula (8) respectively:

$$C_e(x, u) = 0 \quad (7)$$

$$C_e(x(n), u(n)) = 0 \quad (8)$$

For example, constraint may be performed by controlling the velocity of the foot end of the robot relative to the ground at the end time moment of the jump to be 0, or by setting an initial value of the robot state variable x as the same as a set initial value, as shown in formula (9):

$$x(1) = x_{init} \quad (9)$$

In the formula (9), x(1) represents the initial value of the state variable x, and $x_{init}$ represents the set initial value of the state variable, that is, the constraint on the robot velocity model is realized through the set initial value.

3. A Mechanical Model of the Foot End of the Robot Relative to the Ground:

In an example, a plantar force of a swing foot may be controlled to be 0 by constraining the plantar force of the robot's swing foot, as shown in formula (10):

$$f_i(n) = [0;0;0](n = [n_{flight}, n_{land}], i = i_{flight}) \quad (10)$$

In the formula (10), n represents that the foot is in the control stage, and $f_i(n)$ represents the plantar force of the robot's swing foot.

In another example, an inequality constraint is imposed on the mechanical model of the robot, and a schematic continuous system formula and a discrete formula are shown in formula (11) and formula (12) respectively:

$$C_e(x, u) < 0 \quad (11)$$

$$C_e(x(n), u(n)) < 0 \quad (12)$$

For example, the mechanical model may be subjected to inequality constraint by controlling a ratio of a friction force of a foot end on the ground to a vertical support force not to exceed a friction coefficient, as shown in formula (13):

$$f_i = [f_{i_x}; f_{i_y}; f_{i_z}], f_{i_x} \leq \mu f_{i_z}, f_{i_y} \leq \mu f_{i_z} \tag{13}$$

In the formula (13), $f_{i_x}$, $f_{i_y}$, $f_{i_z}$ represent the friction forces of the foot end along the x, y, and z directions respectively, and μ represents the friction coefficient. Through this constraint method, it can be guaranteed that the robot will not slip to affect the jump effect.

In the solutions described in the embodiments of the present disclosure, multiple sets of preset jump parameters are input into the preset cost function model as reference values to obtain corresponding multiple jump trajectories, and the cost function is constrained based on a relevant model to obtain a jump trajectory that can satisfy the corresponding jump parameter, and the action library is established based on these trajectories. Thus, the robot can obtain the jump trajectory corresponding to the jump parameter in time, and the computational pressure in the jump control stage can be reduced.

For the above embodiments, the robot may obtain the jump parameter through various ways.

In an example, the robot may receive the jump parameter sent by a terminal device. A user may directly set the jump action of the robot by inputting the jump parameter into the terminal device.

If a difference between the generated jump parameter and a preset jump parameter in the action library is too large, that is, if a jump trajectory corresponding to the jump parameter cannot be obtained based on the preset action library, prompt information may be sent to the terminal device message, to prompt the user that there is currently no applicable jump trajectory, and suggest the user to input other jump parameter(s).

In another example, if the robot is provided with an environmental information collection device such as laser radar or RGB-D camera, information of an obstacle in front of the robot may be detected by the environmental information collection device. For example, point cloud information in the direction of movement of the robot detected by the collection device is obtained by a visual system to obtain the shape of the obstacle. And, the jump parameter is determined based on the shape of the obstacle.

Specifically, the expected jump height in the jump parameter may be set to be greater than the obstacle height, so as to ensure that the robot can go over the obstacle. In addition, in a case where the robot needs to be controlled to jump over an obstacle, the jump parameter should also include a take-off position of the robot. The take-off position may be determined according to the expected velocity and the height of the obstacle, so that the robot can take off from a proper place, avoiding a failure in going over the obstacle because the take-off position is too far from or too close to the obstacle.

In addition, if the difference between the generated jump parameter and a preset jump parameter in the action library is too large, similarly, prompt information may be sent to the terminal device to prompt the user that there is currently no applicable jump trajectory, and the robot cannot go over the obstacle ahead.

In the solutions described in the embodiments of the present disclosure, the robot can obtain the jump parameter through the terminal device or the detection result of the obstacle, so that the robot can perform the jump action according to the user's expectation or go over the obstacle through the jump action.

In an alternative embodiment, after the robot reaches the expected velocity, it can further switch to a support state. The support state indicates that all the foot ends of the robot are in contact with the ground. The footholds of the foot ends may be determined according to the expected velocity before take-off and a preset support time.

Figure 3:
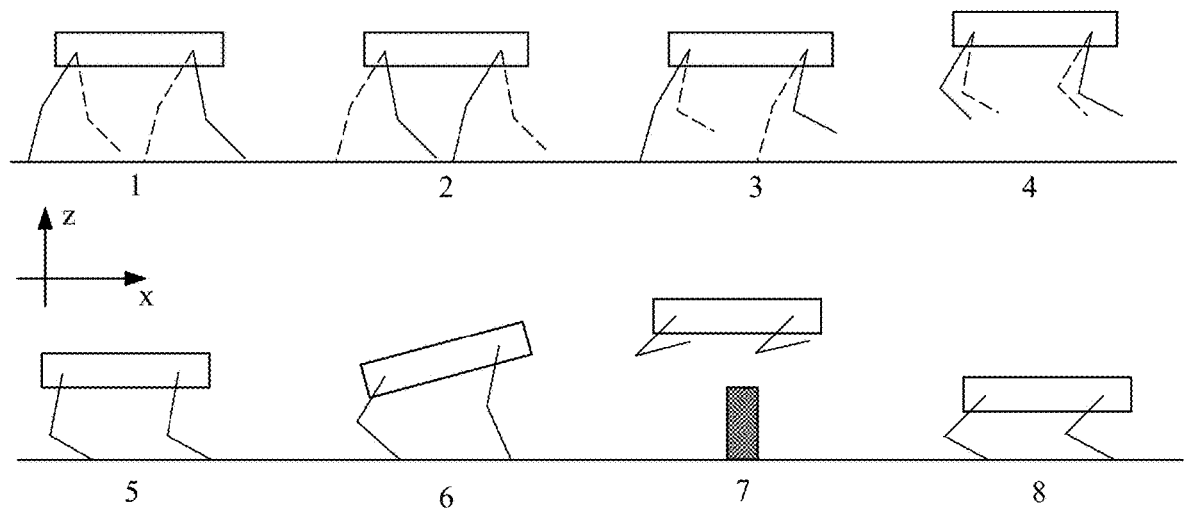
FIG. 3 is a schematic diagram of a robot jump procedure according to an example embodiment of the present disclosure.

FIG. 3 shows a schematic diagram of a jump procedure of a robot according to an example embodiment of the present disclosure.

As shown in FIG. 3, taking a quadruped robot moving along the positive x direction as an example, the solid lines represent the right legs of the robot, and the dotted lines represent the left legs of the robot. After the robot completes the "run-up" procedure in 1-2 procedures, the robot may switch from the Trot gait to the quadruped support state by jumping forward through 3-5 procedures to enter the last time moment before the take-off, and jump actions in 6-8 procedures are performed. In the quadruped support state, the robot can provide elastic potential energy for the jump procedure through all the supporting feet on the premise of continuing to retain the kinetic energy, so as to improve the jump effect. In addition, using the support state as the initial state of the jump procedure can reduce the amount of calculations and simplify the difficulty of establishing the action library.

In one example, the foothold of the robot in the quadruped support state may be determined by formula (14):

$$P = \frac{1}{2} v_{ref} T_{support} \tag{14}$$

In the formula (14), Vref represents the expected velocity, $T_{support}$ represents the preset support time, that is, the robot's support state maintenance time, P represents the foothold, that is, the distance of the robot's foot end relative to the robot's hip joint along the x-axis direction, that is, "the distance that the robot's support foot needs to protrude forward". Because $T_{support}$ time is short, and the velocity of the robot from "run-up" to the support state remains unchanged, MPC and WBC can continue to be used to control the robot. In addition, in the support state, each support foot of the robot is in the same pose, and thus the current specific poses of all the support feet can be determined according to the foothold of one support foot.

Preferably, in a case where the jump parameter further includes a take-off position, the robot may also be controlled to switch to the support state at the take-off position, so that the robot can take off at a proper place. In a case where the jump parameter does not include the take-off position, the robot may be controlled to switch to the support state after reaching the expected velocity, or switch to the support state after moving at a constant velocity for a preset running distance after reaching the expected velocity.

In the solutions described in the embodiments of the present disclosure, by controlling the robot to switch to the support state after reaching the expected velocity, elastic potential energy is provided through all support feet to improve the jump effect of the robot. In addition, using the support state as the initial state of the jump procedure can reduce the amount of calculations, and simplify the establishment difficulty of the action library.

Figure 4:
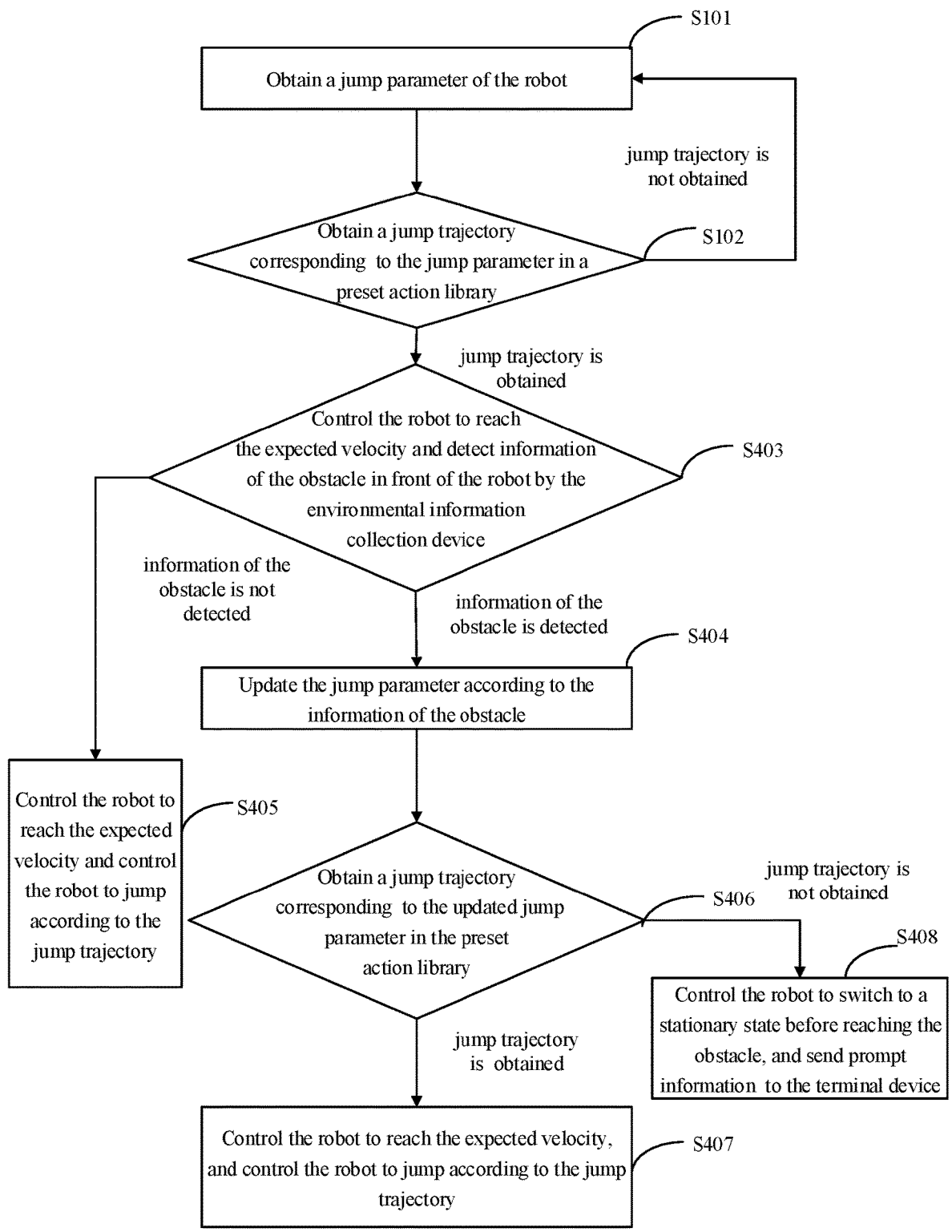
FIG. 4 is a flowchart of another motion control method according to an example embodiment of the present disclosure.

In an alternative embodiment, in the process of controlling the robot to reach the expected velocity, if the robot is also equipped with an environmental information collection device, the method shown in FIG. 4 may be used continue to detect information of the obstacle in front of the robot to optimize the jump trajectory.

In step S403, information of the obstacle in front of the robot is detected by the environmental information collection device. If the information of the obstacle is received, the method proceeds to step S404; and if the information of the obstacle is not received, the method proceeds to step S405, i.e., controlling the robot to reach the expected velocity, and controlling the robot to jump according to the jump trajectory.

In step S404, the jump parameter is updated according to the information of the obstacle, where the expected jump height in the updated jump parameter is greater than the height of the obstacle.

Similarly, the expected jump height in the jump parameter may be set to be greater than the obstacle height to ensure that the robot can go over the obstacle. In addition, if the jump parameter before the update includes the take-off position, the take-off position is updated according to the current information of the obstacle; if the jump parameter before the update does not include the take-off position, the take-off position may be added according to the current information of the obstacle.

Preferably, before updating the jump parameter, the robot may also compare the current jump parameters with the currently detected obstacle information to determine whether the jump parameter needs to be updated.

Specifically, if the robot has obtained the jump parameter including the take-off position before the "run-up", the robot may determine whether it is still possible to go over the newly detected obstacle based on the current take-off position and the jump trajectory; if it is determined that the robot cannot go over the newly detected obstacle, the robot may update the jump parameter based on the information of the obstacle; and if it is determined that the robot can still go over the newly detected obstacle, the robot may continue to jump according to the originally planned take-off position and jump trajectory. This can further reduce the robot's calculation pressure on the premise of ensuring that the robot can successfully go over the obstacle.

In step S406, a jump trajectory corresponding to the updated jump parameter is obtained in the preset action library. In a case where the jump trajectory is obtained, the method proceeds to step S407; in a case where a target jump trajectory is not obtained, the method proceeds to step S408.

In step S407, the robot is controlled to reach the expected velocity in the updated jump parameter, and the robot jumps according to the jump trajectory.

In step S408, the robot is controlled to switch to a stationary state before reaching the obstacle, and prompt information is sent to the terminal device. The prompt information is used to prompt the user that there is no applicable jump trajectory.

If a target jump trajectory cannot be obtained because the current obstacle is too high, or based on the current velocity, the expected velocity cannot be reached at the take-off position or the height of the obstacle cannot be gone over, the robot may be controlled to switch to the stationary state before reaching the obstacle to avoid that the robot collides with obstacle, and prompt information may be displayed to notify the user.

In the solutions described in the embodiments of the present disclosure, during the process of controlling the robot to reach the expected velocity, the information of the obstacle in front of the robot is detected by the environment information collection device and the jump parameter is updated to obtain a new jump trajectory. In this way, during the "run-up" procedure, the robot can continue to adjust the jump action according to the current actual environmental state to go over the obstacle, so that the robot has the ability to jump over and avoid the obstacle during the "run-up" procedure, and the robot's jump effect can be improved.

For the foregoing method embodiments, for the sake of simplicity in description, they are expressed as a series of action combinations, but those skilled in the art should understand that the present disclosure is not limited by the described action sequence(s), because according to the present disclosure, some steps may be performed in other order or some steps may be performed simultaneously.

Secondly, those skilled in the art should also understand that the embodiments described in the specification are all alternative embodiments, and the actions and modules involved are not necessarily required by the present disclosure.

Corresponding to the aforementioned embodiments of the methods for implementing application functions, the present disclosure also provides embodiments of apparatuses for implementing application functions and a corresponding terminal.

Figure 5:
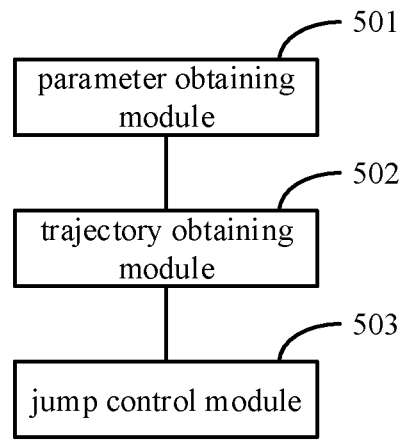
FIG. 5 is a schematic diagram of a motion control apparatus according to an example embodiment of the present disclosure.

A block diagram of a jumping apparatus shown in an example embodiment of the present disclosure is shown in FIG. 5. The apparatus is applied to a legged robot, and the apparatus includes: a parameter obtaining module 501, a trajectory obtaining module 502 and a jump control module 503.

The parameter obtaining module 501 is configured to obtain a jump parameter of the robot, where the jump parameter includes an expected velocity and an expected jump height before take-off of the robot.

The trajectory obtaining module 502 is configured to obtain a jump trajectory corresponding to the jump parameter in a preset action library, where the action library includes a jump trajectory that is marked with a corresponding jump parameter.

The jump control module 503 is configured to control the robot to reach the expected velocity, and controlling the robot to jump according to the jump trajectory.

In connection with any implementation of the present disclosure, the apparatus further includes:
 an action library obtaining module configured to input multiple sets of preset jump parameters into a preset cost function model as reference values to obtain corresponding multiple jump trajectories, where the jump trajectory includes a control parameter of the robot at a corresponding sampling point in a jump procedure.

In connection with any implementation of the present disclosure, a constraint of the cost function model is determined according to at least one of the following model:
 a kinetic model of the robot;
 a velocity model of a foot end of the robot relative to the ground; or
 a mechanical model of the foot end of the robot relative to the ground.

In connection with any implementation of the present disclosure, when the parameter obtaining module obtains the jump parameter of the robot, the parameter obtaining module is configured to:
 receive the jump parameter sent by a terminal device.

In connection with any implementation of the present disclosure, the robot is further provided with an environmental information collection device;
   where when the parameter obtaining module obtains the jump parameter of the robot, the parameter obtaining module is configured to:
   detect information of an obstacle in front of the robot through the environmental information collection device; and
   determine the jump parameter according to the information of the obstacle, where the expected jump height in the jump parameter is greater than a height of the obstacle.

In connection with any implementation of the present disclosure, in a case where the jump parameter further includes a take-off position, when the jump control module controls the robot to reach the expected velocity, the jump control module is configured to:
   control the robot to reach the expected velocity, and switching to a support state at the take-off position, where the support state represents that all foot ends of the robot are in contact with the ground, and footholds of the foot ends are determined according to the expected velocity before take-off of the robot and a preset support time; and
   in a case where the jump parameter does not include the take-off position, controlling the robot to reach the expected velocity includes:
   controlling the robot to reach the expected velocity and switching to the support state.

In connection with any implementation of the present disclosure, when the jump control module control jumping according to the jump trajectory, the jump control module is configured to:
   according to the jump trajectory, control motion controllers of the robot to complete a jump action, where the motion controllers include a whole-body force controller, a joint controller, a velocity controller and a force torque controller.

In connection with any implementation of the present disclosure, the robot is further provided with an environmental information collection device;
   during controlling of the robot to reach the expected velocity, the apparatus further includes a motion update module configured to:
   detect information of an obstacle in front of the robot through the environmental information collection device;
   in response to receiving the information of the obstacle, update the jump parameter according to the information of the obstacle, where the expected jump height in the updated jump parameter is greater than a height of the obstacle;
   obtain a jump trajectory corresponding to the updated jump parameter in the preset action library; and
   control the robot to reach an expected velocity in the updated jump parameter, and to jump according to the jump trajectory.

In connection with any implementation of the present disclosure, in a case where a target jump trajectory corresponding to the updated jump parameter cannot be obtained based on the preset action library, the apparatus further includes a first prompt module configured to:
   control the robot to switch to a stationary state before reaching the obstacle, and send prompt information to a terminal device, where the prompt information is used to prompt a user that there is no applicable jump trajectory.

In connection with any implementation of the present disclosure, in a case where a jump trajectory corresponding to the jump parameter cannot be obtained based on the preset action library, the apparatus further includes a second prompt module configured to:
   send prompt information to a terminal device, where the prompt information is used to prompt a user that there is no applicable jump trajectory.

As for the apparatus embodiments, since the apparatus embodiments basically correspond to the method embodiments, for related descriptions, reference may be made to the descriptions of the method embodiments. The apparatus embodiments described above are only illustrative, and the above-mentioned units described as separate components may or may not be physically separated, and the components shown as units may or may not be physical units, that is, they may be located in a place, or can also be distributed to multiple network elements. Part or all of the modules can be selected according to actual needs to achieve the purpose(s) of the disclosed solution(s). It can be understood and implemented by those skilled in the art without creative effort.

The technical solutions of the present disclosure are as follows.

According to a first aspect of embodiments of the present disclosure, there is provided a motion control method. The method is applied to a legged robot, and the method includes:
   obtaining a jump parameter of the robot, where the jump parameter includes an expected velocity and an expected jump height before take-off of the robot;
   obtaining a jump trajectory corresponding to the jump parameter in a preset action library, where the action library includes a jump trajectory that is marked with a corresponding jump parameter; and
   controlling the robot to reach the expected velocity, and controlling the robot to jump according to the jump trajectory.

In an example embodiment of the present disclosure, the method further includes:
   inputting multiple sets of preset jump parameters into a preset cost function model as reference values to obtain corresponding multiple jump trajectories, where the jump trajectory includes a control parameter of the robot at a corresponding sampling point in a jump procedure.

In an example embodiment of the present disclosure, a constraint of the cost function model is determined according to at least one of the following model:
   a kinetic model of the robot;
   a velocity model of a foot end of the robot relative to the ground; or
   a mechanical model of the foot end of the robot relative to the ground.

In an example embodiment of the present disclosure, obtaining the jump parameter of the robot includes:
   receiving the jump parameter sent by a terminal device.

In an example embodiment of the present disclosure, the robot is further provided with an environmental information collection device;
   where obtaining the jump parameter of the robot includes:
   detecting information of an obstacle in front of the robot through the environmental information collection device; and determining the jump parameter according to the information of the obstacle, where the expected jump height in the jump parameter is greater than a height of the obstacle.

In an example embodiment of the present disclosure, in a case where the jump parameter further includes a take-off position, controlling the robot to reach the expected velocity includes:

controlling the robot to reach the expected velocity, and switching to a support state at the take-off position, where the support state represents that all foot ends of the robot are in contact with the ground, and footholds of the foot ends are determined according to the expected velocity before take-off of the robot and a preset support time; and in a case where the jump parameter does not include the take-off position, controlling the robot to reach the expected velocity includes:

controlling the robot to reach the expected velocity and switching to the support state.

In an example embodiment of the present disclosure, jumping according to the jump trajectory includes:

according to the jump trajectory, controlling motion controllers of the robot to complete a jump action, where the motion controllers include a whole-body force controller, a joint controller, a velocity controller and a force torque controller.

In an example embodiment of the present disclosure, the robot is further provided with an environmental information collection device;

during controlling of the robot to reach the expected velocity, the method further includes:

detecting information of an obstacle in front of the robot through the environmental information collection device;

in response to receiving the information of the obstacle, updating the jump parameter according to the information of the obstacle, where the expected jump height in the updated jump parameter is greater than a height of the obstacle;

obtaining a jump trajectory corresponding to the updated jump parameter in the preset action library; and controlling the robot to reach an expected velocity in the updated jump parameter, and to jump according to the jump trajectory.

In an example embodiment of the present disclosure, in a case where a target jump trajectory corresponding to the updated jump parameter cannot be obtained based on the preset action library, the method further includes:

controlling the robot to switch to a stationary state before reaching the obstacle, and sending prompt information to a terminal device, where the prompt information is used to prompt a user that there is no applicable jump trajectory.

In an example embodiment of the present disclosure, in a case where a jump trajectory corresponding to the jump parameter cannot be obtained based on the preset action library, the method further includes:

sending prompt information to a terminal device, where the prompt information is used to prompt a user that there is no applicable jump trajectory.

According to a second aspect of embodiments of the present disclosure, there is provided a motion control apparatus. The apparatus is applied to a legged robot, and the apparatus includes:

a parameter obtaining module configured to obtain a jump parameter of the robot, where the jump parameter includes an expected velocity and an expected jump height before take-off of the robot;

a trajectory obtaining module configured to obtain a jump trajectory corresponding to the jump parameter in a preset action library, where the action library includes a jump trajectory that is marked with a corresponding jump parameter; and a jump control module configured to control the robot to reach the expected velocity, and controlling the robot to jump according to the jump trajectory.

In an example embodiment of the present disclosure, the apparatus further includes:

an action library obtaining module configured to input multiple sets of preset jump parameters into a preset cost function model as reference values to obtain corresponding multiple jump trajectories, where the jump trajectory includes a control parameter of the robot at a corresponding sampling point in a jump procedure.

In an example embodiment of the present disclosure, a constraint of the cost function model is determined according to at least one of the following model:

a kinetic model of the robot;

a velocity model of a foot end of the robot relative to the ground; or a mechanical model of the foot end of the robot relative to the ground.

In an example embodiment of the present disclosure, when the parameter obtaining module obtains the jump parameter of the robot, the parameter obtaining module is configured to:

receive the jump parameter sent by a terminal device.

In an example embodiment of the present disclosure, the robot is further provided with an environmental information collection device;

where when the parameter obtaining module obtains the jump parameter of the robot, the parameter obtaining module is configured to:

detect information of an obstacle in front of the robot through the environmental information collection device; and determine the jump parameter according to the information of the obstacle, where the expected jump height in the jump parameter is greater than a height of the obstacle.

In an example embodiment of the present disclosure, in a case where the jump parameter further includes a take-off position, when the jump control module controls the robot to reach the expected velocity, the jump control module is configured to:

control the robot to reach the expected velocity, and switching to a support state at the take-off position, where the support state represents that all foot ends of the robot are in contact with the ground, and footholds of the foot ends are determined according to the expected velocity before take-off of the robot and a preset support time; and in a case where the jump parameter does not include the take-off position, controlling the robot to reach the expected velocity includes:

controlling the robot to reach the expected velocity and switching to the support state.

In an example embodiment of the present disclosure, when the jump control module control jumping according to the jump trajectory, the jump control module is configured to:

according to the jump trajectory, control motion controllers of the robot to complete a jump action, where the motion controllers include a whole-body force controller, a joint controller, a velocity controller and a force torque controller.

In an example embodiment of the present disclosure, the robot is further provided with an environmental information collection device;

during controlling of the robot to reach the expected velocity, the apparatus further includes a motion update module configured to:

detect information of an obstacle in front of the robot through the environmental information collection device;

in response to receiving the information of the obstacle, update the jump parameter according to the information of the obstacle, where the expected jump height in the updated jump parameter is greater than a height of the obstacle;

obtain a jump trajectory corresponding to the updated jump parameter in the preset action library; and control the robot to reach an expected velocity in the updated jump parameter, and to jump according to the jump trajectory.

In an example embodiment of the present disclosure, in a case where a target jump trajectory corresponding to the updated jump parameter cannot be obtained based on the preset action library, the apparatus further includes a first prompt module configured to:

control the robot to switch to a stationary state before reaching the obstacle, and send prompt information to a terminal device, where the prompt information is used to prompt a user that there is no applicable jump trajectory.

In an example embodiment of the present disclosure, in a case where a jump trajectory corresponding to the jump parameter cannot be obtained based on the preset action library, the apparatus further includes a second prompt module configured to:

send prompt information to a terminal device, where the prompt information is used to prompt a user that there is no applicable jump trajectory.

According to a third aspect of embodiments of the present disclosure, there is provided a robot, including:

a memory for storing processor-executable instructions; and a processor configured to execute the executable instructions in the memory to implement steps of the method according to any implementation of the first aspect.

According to a fourth aspect of embodiments of the present disclosure, there is provided a non-transitory computer-readable storage medium having a computer program stored thereon. When the program is executed by a processor, steps of the method according to any implementation of the first aspect are implemented.

Figure 6:
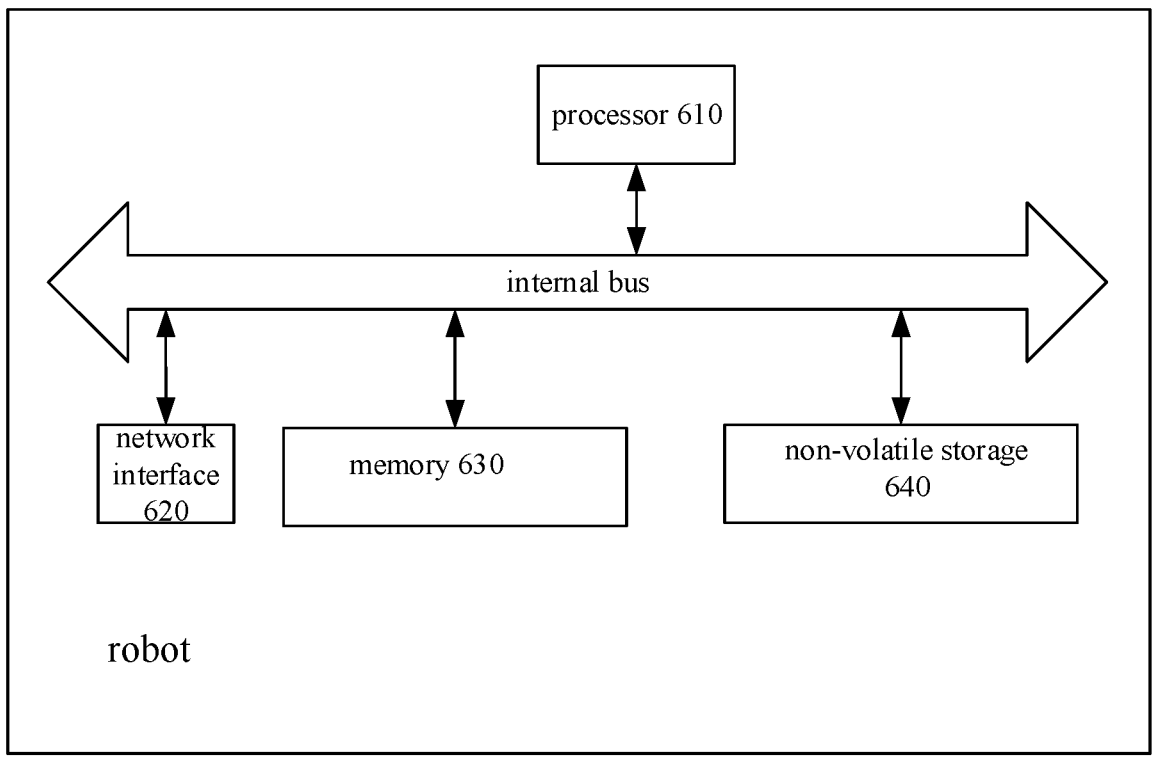
FIG. 6 is a hardware structural diagram of a computer device according to an example embodiment of the present disclosure.

The embodiments of the motion control apparatus in the present disclosure may be applied to a computer device of the robot, such as a server or a terminal device. The apparatus embodiments may be implemented by software, or by hardware, or by a combination of software and hardware. Taking software implementation as an example, as an apparatus in a logical sense, the apparatus is formed by reading corresponding computer program instructions in a non-volatile storage into a memory and running the instructions through a processor for motion control where the apparatus resides. From the hardware level, FIG. 6 shows a hardware structure diagram of the computer device of the robot where the motion control apparatus according to embodiments of the present disclosure resides. In addition to a processor 610, a memory 630, a network interface 620 and a non-volatile storage 640 shown in FIG. 6, a server or electronic device where the apparatus in the embodiments resides may further include other hardware usually according to actual functions of the computer device, which will not be described in detail here.

Other embodiments of the disclosure will be readily apparent to those skilled in the art from consideration of the specification and practice of the disclosure disclosed herein. The present disclosure is intended to cover any modification, use or adaptation of the present disclosure, and these modifications, uses or adaptations follow the general principles of the present disclosure and include common knowledge or conventional technical means in the technical field which is not disclosed in the present disclosure. The specification and embodiments are to be considered exemplary only, with a true scope and spirit of the disclosure being indicated by the appended claims.

It should be understood that the present disclosure is not limited to the precise structures which have been described above and shown in the drawings, and various modifications and changes may be made without departing from the scope of the present disclosure. The scope of the present disclosure is limited only by the appended claims.

What is claimed is:

1. A motion control method, wherein the method is applied to a legged robot, and the method comprises:

obtaining a jump parameter of the robot, wherein the jump parameter comprises an expected velocity and an expected jump height before take-off of the robot;

obtaining a jump trajectory corresponding to the jump parameter in a preset action library, wherein the preset action library comprises a jump trajectory that is marked with a corresponding jump parameter; and controlling the robot to reach the expected velocity, and controlling the robot to jump according to the jump trajectory, wherein in response to the jump parameter further comprising a take-off position, controlling the robot to reach the expected velocity comprises:

controlling the robot to reach the expected velocity, and switching to a support state at the take-off position, wherein the support state represents that all foot ends of the robot are in contact with a ground, and footholds of the foot ends are determined according to the expected velocity before take-off of the robot and a preset support time; and wherein in response to the jump parameter not comprising the take-off position, controlling the robot to reach the expected velocity comprises:

controlling the robot to reach the expected velocity, and switching to the support state.

2. The method according to claim 1, further comprising:

inputting multiple sets of preset jump parameters into a preset cost function model as reference values to obtain corresponding multiple jump trajectories, wherein the jump trajectory comprises a control parameter of the robot at a corresponding sampling point in a jump procedure.

3. The method according to claim 2, wherein a constraint of the preset cost function model is determined according to at least one of following models:

a kinetic model of the robot;

a velocity model of a foot end of the robot relative to a ground; or a mechanical model of the foot end of the robot relative to the ground.

4. The method according to claim 1, wherein obtaining the jump parameter of the robot comprises:
receiving the jump parameter sent by a terminal device.

5. The method according to claim 4, wherein in a case where the jump trajectory corresponding to the jump parameter cannot be obtained based on the preset action library, the method further comprises:
sending prompt information to a terminal device, wherein the prompt information is used to prompt a user that there is no applicable jump trajectory.

6. The method according to claim 1, wherein the robot is further provided with an environmental information collection device;
wherein obtaining the jump parameter of the robot comprises:
detecting information of an obstacle in front of the robot through the environmental information collection device; and
determining the jump parameter according to the information of the obstacle, wherein the expected jump height in the jump parameter is greater than a height of the obstacle.

7. The method according to claim 1, wherein controlling the robot to jump according to the jump trajectory comprises:
according to the jump trajectory, controlling motion controllers of the robot to complete a jump action, wherein the motion controllers comprise a whole-body force controller, a joint controller, a velocity controller and a force torque controller.

8. The method according to claim 1, wherein the robot is further provided with an environmental information collection device; and
controlling the robot to reach the expected velocity further comprises:
detecting information of an obstacle in front of the robot through the environmental information collection device;
in response to receiving the information of the obstacle, updating the jump parameter according to the information of the obstacle, wherein the expected jump height in an updated jump parameter is greater than a height of the obstacle;
obtaining the jump trajectory corresponding to the updated jump parameter in the preset action library; and
controlling the robot to reach the expected velocity in the updated jump parameter, and to jump according to the jump trajectory.

9. The method according to claim 8, wherein in a case where a target jump trajectory corresponding to the updated jump parameter cannot be obtained based on the preset action library, the method further comprises:
controlling the robot to switch to a stationary state before reaching the obstacle, and sending prompt information to a terminal device, wherein the prompt information is used to prompt a user that there is no applicable jump trajectory.

10. A motion control apparatus, wherein the apparatus is applied to a legged robot, and the apparatus comprises:
a processor; and
a memory for storing instructions executable by the processor,
wherein the processor, by executing the instructions, is configured to:

obtain a jump parameter of the robot, wherein the jump parameter comprises an expected velocity and an expected jump height before take-off of the robot;
obtain a jump trajectory corresponding to the jump parameter in a preset action library, wherein the preset action library comprises a jump trajectory that is marked with a corresponding jump parameter; and
control the robot to reach the expected velocity, and controlling the robot to jump according to the jump trajectory,
wherein in response to the jump parameter further comprising a take-off position, the processor is configured to:
control the robot to reach the expected velocity, and switch to a support state at the take-off position, wherein the support state represents that all foot ends of the robot are in contact with a ground, and footholds of the foot ends are determined according to the expected velocity before take-off of the robot and a preset support time; and
wherein in response to the jump parameter not comprising the take-off position, the processor is configured to:
control the robot to reach the expected velocity and switching to the support state.

11. The apparatus according to claim 10, wherein the processor is configured to:
input multiple sets of preset jump parameters into a preset cost function model as reference values to obtain corresponding multiple jump trajectories, wherein the jump trajectory comprises a control parameter of the robot at a corresponding sampling point in a jump procedure.

12. The apparatus according to claim 11, wherein a constraint of the preset cost function model is determined according to at least one of following models:
a kinetic model of the robot;
a velocity model of a foot end of the robot relative to a ground; or
a mechanical model of the foot end of the robot relative to the ground.

13. The apparatus according to claim 10, wherein the processor is configured to:
receive the jump parameter sent by a terminal device.

14. The apparatus according to claim 13, wherein in a case where the jump trajectory corresponding to the jump parameter cannot be obtained based on the preset action library, the processor is further configured to:
send prompt information to a terminal device, wherein the prompt information is used to prompt a user that there is no applicable jump trajectory.

15. The apparatus according to claim 10, wherein the robot is further provided with an environmental information collection device;
wherein the processor is configured to:
detect information of an obstacle in front of the robot through the environmental information collection device; and
determine the jump parameter according to the information of the obstacle, wherein the expected jump height in the jump parameter is greater than a height of the obstacle.

16. The apparatus according to claim 10, wherein the processor is configured to:
according to the jump trajectory, control motion controllers of the robot to complete a jump action, wherein the motion controllers comprise a whole-body force controller, a joint controller, a velocity controller and a force torque controller.

17. The apparatus according to claim 10, wherein the robot is further provided with an environmental information collection device;
   wherein during controlling the robot to reach the expected velocity, the processor is further configured to:
      detect information of an obstacle in front of the robot through the environmental information collection device;
      in response to receiving the information of the obstacle, update the jump parameter according to the information of the obstacle, wherein the expected jump height in an updated jump parameter is greater than a height of the obstacle;
      obtain the jump trajectory corresponding to the updated jump parameter in the preset action library; and
      control the robot to reach the expected velocity in the updated jump parameter, and to jump according to the jump trajectory.

18. The apparatus according to claim 17, wherein in a case where a target jump trajectory corresponding to the updated jump parameter cannot be obtained based on the preset action library, the processor is further configured to:
   control the robot to switch to a stationary state before reaching the obstacle, and send prompt information to a terminal device, wherein the prompt information is used to prompt a user that there is no applicable jump trajectory.

* * * * *